(12) United States Patent
Henry

(10) Patent No.: US 6,329,482 B1
(45) Date of Patent: Dec. 11, 2001

(54) POLYMERIZABLE COMPOSITIONS BASED ON DIFUNCTIONAL MONOMERS, RESINS AND OPHTHALMIC ARTICLES CONTAINING SAME

(75) Inventor: David Henry, Morigny-Champigny (FR)

(73) Assignee: Corning, S.A., Avon Cedex (FR)

( * ) Notice: Subject to any disclaimer, the term of this patent is extended or adjusted under 35 U.S.C. 154(b) by 0 days.

(21) Appl. No.: 09/403,828

(22) PCT Filed: May 1, 1998

(86) PCT No.: PCT/US98/09072

§ 371 Date: Feb. 15, 2000

§ 102(e) Date: Feb. 15, 2000

(87) PCT Pub. No.: WO98/50443

PCT Pub. Date: Nov. 12, 1998

(30) Foreign Application Priority Data

May 2, 1997 (FR) .................................................. 97 05488

(51) Int. Cl.$^7$ .................................................. C08F 126/06
(52) U.S. Cl. ........................... 526/260; 526/286; 526/301
(58) Field of Search ................................. 526/260, 286, 526/301

(56) References Cited

U.S. PATENT DOCUMENTS

| | | | |
|---|---|---|---|
| 4,980,497 | 12/1990 | Sasagawa et al. | 560/33 |
| 5,084,538 | 1/1992 | Suzuki et al. | 526/261 |
| 5,349,035 | 9/1994 | Brand et al. | 526/284 |
| 5,373,033 | 12/1994 | Toh et al. | 522/96 |
| 5,708,064 | 1/1998 | Coleman et al. | 524/90 |

FOREIGN PATENT DOCUMENTS 0 345 748B1    4/1995    (EP) .

*Primary Examiner*—Bernard Lipman

(57) ABSTRACT

The object of the present invention is a radically polymerisable composition comprising a mixture of at least: one or more (meth)acrylate difunctional monomer(s) of type (a): of formula (A) and/or of formula (A'); and one or more alkenic difunctional monomers of type (b): of formula (B) and/or of formula (B') and/or of formula (B"). The invention also relates to the resins obtained by polymerization of the compositions and the ophthalmic articles constituted, wholly or in part, of the resins, and the articles may optionally have photochromic properties.

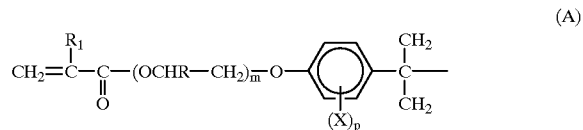

(A)

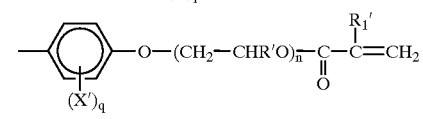

(A')

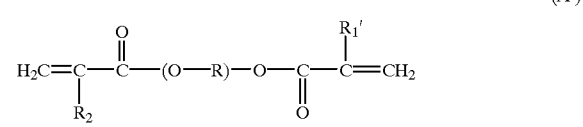

(B)

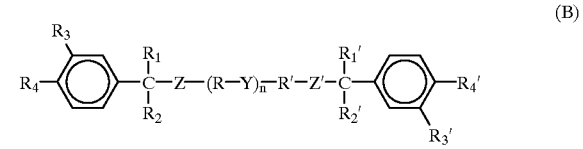

(B')

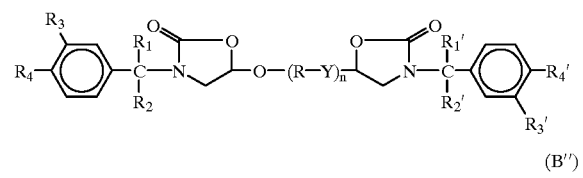

(B'')

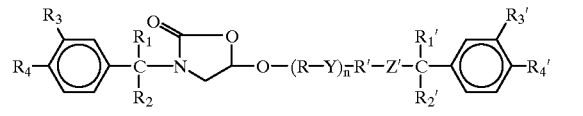

33 Claims, No Drawings

POLYMERIZABLE COMPOSITIONS BASED ON DIFUNCTIONAL MONOMERS, RESINS AND OPHTHALMIC ARTICLES CONTAINING SAME

The objects of the present invention are:
a radically polymerizable composition based on at least two different types of difunctional monomers;
A resin obtained by copolymerization of the composition; the resin having a nanobiphasic structure and it being possible for the resin to be photochromic or non-photochromic.
articles, notably ophthalmic articles, constituted wholly or in part of the resin.

The creation of a plastic ophthalmic lens is a difficult exercise insofar as it is required that the structure of the lens be free from optical constraints and posses obviously satisfactory mechanical properties. In order to attain this result, it is convenient to perfectly master the copolymerization reactions carried out during the development of the lens. It is in any case necessary to prevent attaining the gel point of the reaction system too quickly in other to avoid the formation of strings and other optical defects as a result of non-uniform polymerization. This is problematic insofar as the basic monomers known to this day are generally symmetrical difunctional monomers.

Furthermore, within the context of the creation of photochromic ophthalmic lenses by either radical polymerization of compositions containing at least one photochromic coloring agent, or by subsequent diffusion of such coloring agents in polymerized matrices, it is appropriate that the structure of the lenses have, in addition to having good optical properties good photochromic properties without a notable alteration of the mechanical properties of the lens.

It is not easy to obtain an acceptable photochromic properties/mechanical properties compromise. It is the object of the invention to prepare a nanobiphasic structure (in order to prevent phenomena of light-diffusion which affect optical quality) which has a phase that ensures the mechanical rigidity of the structure and another phase which confers sufficient suppleness (or softness) to the structure in order to allow the photochromic coloring agent(s) incorporated within to express their photochromic properties rapidly and at their best.

To our best knowledge, satisfactory compositions have not been prepared (both from the point of view of the expression of the photochromism and from the point of view of the absence of constraints).

It has been proposed, in the applications EP-A-0 453 149 and WO-A-95 10790, to copolymerize two types of monomers which both nevertheless have the same type of reactive functions (acrylate groups and/or methacrylate groups). The result is not very satisfactory in terms of optical properties and ease of manufacturing.

In order to minimize, even prevent the optical constraints, it has been proposed in the patent U.S. Pat. No. 5,349,035 to associate at least one other monomer, notably styrene, to a monomer of the dimethylacrylate type, and to carry out the copolymerization in the presence of an effective amount of a chain transfer agent. However, the matrix obtained is not appropriate for sufficiently expressing or optimizing the photochromic properties of the photochromic coloring agents.

Difunctional monomers have been described in the EP-A-0 345 748 and EP-A-0 351 534 which have a terminal isopropylene function and which are appropriate for the preparation of hard transparent resins. It has also been described in the applications EP-A-0 385 456 and EP-A-0 572 077, short chain plurifunctional monomers and their copolymerization with other functionalized monomers (acrylate, methacrylate, and/or styrene) for preparing transparent resins with high surface hardness. The hard resins, according to these four European patent applications, are orientated towards non-photochromic ophthalmic applications. The monomers are obtained from compounds of formula:

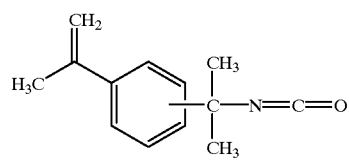

known under the designation TMI®.

Furthermore, an abundant literature exists on the chemistry of such compounds and notably on that of 3-isopropenyl-α,α-dimethylbenzyl isocyanate (compound of the above formula with the two substituents in meta, known under the designation m-TMI®). This chemistry is based upon the reactivity of the isocyanate group.

The Applicant now proposes an original solution to this technical problem of compromise between the optical properties, even photochromic properties, and the mechanical properties of a plastic material usable notably in ophthalmology. The present invention consists of associating at least one long-chain alkenic difunctional monomer with at least one short-chain (meth)acrylic difunctional monomer by radical copolymerization. The resulting resin has then a nanophasic structure, which provides it with the desirable properties. In fact, the short-chain (meth)acrylic difunctional monomer(s) (of type (a) and of formula (A), (A'): below) bring about rigidity, this rigidity being modulated by the presence of the long-chain alkenic difunctional monomer(s) (of type(b) and of formula (B), (B'), (B"): below), which, in a surprising way, also enable providing the composition with excellent photochromic properties. Thus, the synergistic effect of the differences in functionality of the monomers of type (a) and (b) advantageously retard the gelling of the resulting polymerizable composition. This characteristic allows the resulting resin to display good optical properties, and notably in the case where photochromic coloring agents are incorporated within it, to exhibit optimal photochromic properties rapidly.

The first object of the present invention is therefore a radically polymerizable composition comprising a mixture of at least one or more difunctional monomers of type (a) and one or more difunctional monomers of type (b) all as defined below.

The difunctional monomer(s) of type (a) include one or the other of formulae (A) and (A') below:

Formula (A)

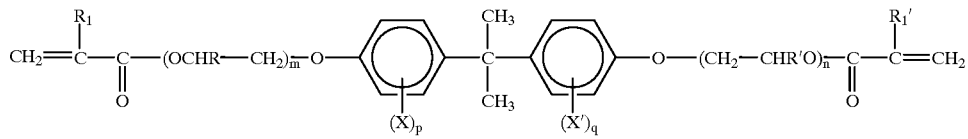

in which:
- $R_1$, $R'_1$, R and R', identical or different, independently are a hydrogen or a methyl group;
- m and n are, independently, integers between 0 and 4 inclusive; and are advantageously independently equal to 1 or 2;
- X and X', identical or different, are a halogen and preferably represent chlorine and/or bromine;
- p and q are, independently, integers between 0 and 4 inclusive;

Formula (A')

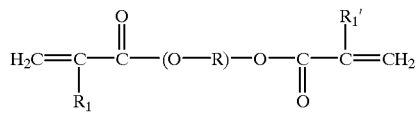

in which:
- $R_1$ and $R'_1$, identical or different, independently are a hydrogen or a methyl group;
- R is a linear or branched alkyl radical having from 2 to 8 carbon atoms, a cycloalkyl radical having from 3 to 6 carbon atoms, an ether radical of formula (R'—O—R") in which R' and R", identical or different, independently are a linear or branched alkyl radical having from 2 to 4 carbon atoms;

The difunctional monomer(s) of type (b)—long-chain alkenic difunctional oligomer—being of one or the other of formulae (B), (B') and (B") below:

Formula (B)

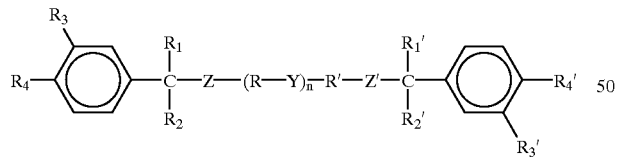

in which:
- $R_1$, $R'_1$, $R_2$ and $R'_2$, identical or different, independently are hydrogen or a linear or branched alkyl radical, advantageously linear, having from 1 to 4 carbon atoms and correspond particularly advantageously to a methyl group;
- $R_3$ and $R_4$, different, are independently one hydrogen and the other an alkenyl radical having from 2 to 6 carbon atoms, advantageously from 2 to 4 carbon atoms and particularly advantageously an isopropenyl radical
- $R'_3$ and $R'_4$, different, are independently one hydrogen and the other an alkenyl radical having from 2 to 6 carbon atoms, advantageously from 2 to 4 carbon atoms and particularly advantageously an isopropenyl radical; (advantageously, the two ends of the molecule are identical; i.e. $R_3=R'_3$ and $R_4=R'_4$);
- Z represents a carbamate function (—NH—CO—O—), a thiocarbamate function (—NH—CO—S—) or a urea function (—NH—CO—NH—);
- Z', independent from Z and advantageously respectively with respect to Z, represents a carbamate function (—O—CO—NH—), a thiocarbamate function (—S—CO—NH—) or a urea function (—NH—CO—NH—);
- R' represents a linear or branched alkyl radical having from 2 to 4 carbon atoms;
- R, identical or different when $n \geq 2$, is a linear or branched alkyl radical having from 2 to 4 carbon atoms;
- Y, identical or different when $n \geq 2$, is oxygen or sulfur;
- n is an integer defined in such a way that the total number of carbon atoms contained in the long chain situated between the two motifs Z and Z' is at least equal to 18 and is advantageously between 18 and 112 inclusive;

Formula (B')

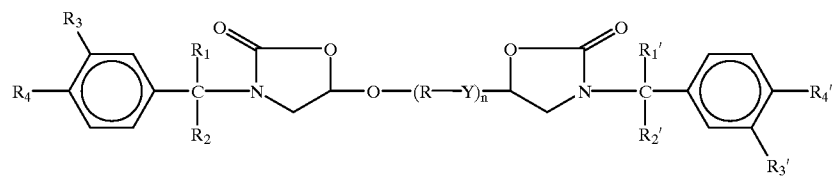

in which:

$R_1$, $R_2$, $R_3$, $R_4$, $R'_1$, $R'_2$, $R'_3$, $R'_4$, R and Y are such as defined above with reference to formula (B);

n is an integer defined in such a way that the total number of carbon atoms contained in the long chain of the motif $(R-Y)_n$ is at least equal to 22 and is advantageously between 22 and 104 inclusive;

Formula (B")

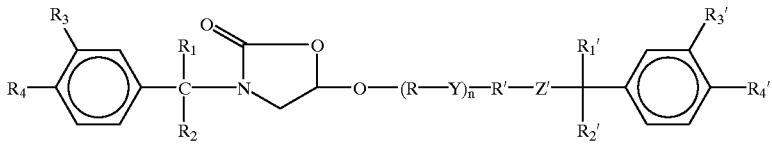

in which:

$R_1$, $R_2$, $R_3$, $R_4$, $R'_1$, $R'_2$, $R'_3$, $R'_4$, R, R' and Y are such as defined above with reference to formula (B);

Z' is a carbamate function (—O—CO—NH—) or Z' is a thiocarbamate function (—S—CO—NH—); advantageously Z' is a carbamate function;

n is an integer defined in such a way that the total number of carbon atoms contained in the long chain of the motif $(R-Y)_n$—R' is at least equal to 22 and is advantageously between 22 and 104 inclusive.

The polymerizable composition further contains:

(c) at least one aromatic monovinylic monomer of Formula (C):

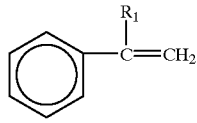

in which $R_1$=H or $CH_3$; the monovinylic monomer advantageously consisting of styrene; and/or (d) at least one aromatic divinylic monomer of Formula (D):

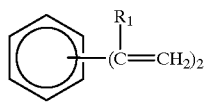

in which $R_1$=H or $CH_3$; the divinylic monomer advantageously consisting of divinylbenzene; and/or (e) at least one (meth)acrylic monomer of Formula (E):

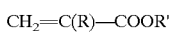

$CH_2=C(R)$—COOR' in which R=H or $CH_3$ and R' is a linear or branched alkyl radical having from 4 to 16 carbon atoms, an optionally substituted methylphenyl or methylphenoxy radical or a polyoxyethoxy group of formula $-(CH_2-CH_2-O)_nR''$ in which n is an integer between 1 and 10 and R''=$CH_3$ or $C_2H_5$; the (meth) acrylic monomer advantageously consisting of ethylhexylmethacrylate; and/or (f) diallylphthalate.

The inventive compositions of the invention generally further contain an effective amount of at least one radical polymerization initiator and an effective amount of at least one polymerization modifier, the polymerization modifier being preferably a chain transfer agent.

In the case where it is desired to confer photochromic properties to the polymerizable compositions of the invention (to the resins obtained by polymerization of the compositions), these contain an effective amount of at least one photochromic coloring agent; the coloring agent(s) being advantageously selected from the group of the spiroxazines, chromenes such as naphthopyrans and benzopyrans, and mixtures thereof. Other useful coloring agents include fulgides, spiropyrans and other photochromic agents.

The nature and the amounts of each one of the compounds in the inventive polymerizable compositions will now be examined in greater detail.

The monomers of type (a) of formula (A) and (A') constitute the short-chain difunctional (meth)acrylate monomers (i.e. diacrylates, dimethacrylates or mixed: acrylates-methacrylates) of the polymerizable composition of the invention. The monomers do or do not have a more or less pronounced symmetry (R/R', $R_1/R'_1$, X/X'). They enable conferring the rigidity, and therefore the mechanical properties, to the polymer (resin) obtained from the polymerizable composition.

These monomers of type (a) may or may not all be of the same formula (A) or (A'). Thus the invention also contemplates polymerizable compositions which contain:

either monomers of formula (A) (at least one);

or monomers of formula (A') (at least one);

or mixtures of different monomers of formulae (A);

or mixtures of different monomers of formulae (A');

or mixtures of monomers of formula(e) (A) and of formula(e) (A').

According to a preferred variant of the invention, one or more symmetrical monomers of type (a) are used. The monomers of type (a), of formula (A) or (A') in which the $R_1$ and $R'_1$ groups are identical are qualified as symmetrical, the same as R and R' groups as well as the X and X' substituents for the compounds of formula (A).

The symmetrical monomers of type (a) of formula (A) are known and are available commercially or are easily accessible to the person skilled in the art. In fact, it may be noted that the monomers do not have a halogen on the aromatic rings, which correspond to the first monomers of formula (I) in the sense described in the WO-A-92/05209 document. The monomers of type (a) of formula (A) having halogen(s) on the aromatic ring(s) will be easily obtained by the person skilled in the art by using derivatives appropriately substituted on the aromatic ring(s). Within the context of the invention, the monomers of formula (A), in which R and R', identical, are hydrogen or a methyl group, $R_1$ and $R'_1$ are a methyl group, m and n are independently equal to 1 or 2, and p=q=0, are preferred. A particularly advantageous variant corresponds to the monomer of formula (A) of the above type with, in addition, R=R'=H and m=n=2. The monomer is notably marketed by Akzo Nobel (NL) under the commercial designation DIACRYL 121. The synthesis of the dissymmetrical monomers of formula (A) are of no particular problem to the person skilled in the art.

The monomers (a) of formula (A') are also well-known and result from the conventional reaction of an aliphatic diol and a short-chain alkyleneglycol (with a maximum of 8 carbon atoms in the chain) with at least one type of (meth) acrylic derivative depending on whether it is desired to obtain monomers of formula (A') which are symmetrical or dissymmetrical at their ends.

These monomers of type (a) intervene generally in the composition to be polymerized at a rate of 40 to 99 parts by weight for 100 parts by weight of the mixture of monomers of type (a) and (b). If they intervene in a smaller amount, the polymerizable composition has a tendency to retract during its polymerization inducing a premature turn-out, which, in turn, is responsible for a deterioration of the optical properties of the final resin.

The monomers (b) of formula (B), (B') and (B") constitute the long-chain difunctional alkenic monomers of the polymerizable composition of the invention. These monomers may or may not have a more or less pronounced symmetry ($R_1/R'_1$, $R_2/R'_2$, $R_3/R'_3$, $R_4/R'_4$, Z/Z').

These monomers of type (b) may or may not all have the same formula (B), (B') or (B"). Thus, the invention contemplates polymerizable compositions, which contain:

either monomers of formula (B) (at least one);

or monomers of formula (B') (at least one);

or monomers of formula (B") (at least one);

or mixtures of different monomers of formulae (B);

or mixtures of different monomers of formulae (B');

or mixtures of different monomers of formulae (B");

or mixtures (mixed, binary or ternary) of two or more monomers selected from the monomers of formula(e) (B), of formula(e) (B') and of formula(e) (B").

The presence of monomer(s) of type (b) in the polymerizable composition of the invention allows a softening of the polymer network by loosening the network without much reduction in the degree of cross-linking of the polymer. This allows conferring interesting mechanical properties to the material at high temperature, characterized notably by a high modulus of elasticity modulus value at the rubber plateau of the polymer.

The monomers of type (b) which are long-chain alkenic difunctional oligomers (the chain being a polyalkylene or polymercaptoalkylene chain, or even a mixed chain), are obtained according to conventional methods of organic synthesis by the reaction between 1. one or several derivatives having a functionality of the alkenylisocyanate type, of formula I and/or II:

formula I

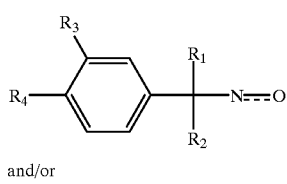

and/or formula II

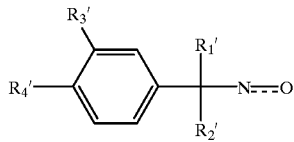

in which $R_1$, $R_2$, $R_3$, $R_4$, $R'_1$, $R'_2$, $R'_3$ and $R'_4$ are such as defined above. According to a preferred variant of the invention, the monomers of type (b) used are symmetrical at their ends. In order to do this a single type of alkenylisocyanate derivative (thus formulae I and II are identical) is used. In a particularly advantageous way, a vinylisocyanate derivative is used in which $R_1=R_2=CH_3$ (or $R'_1=R'_2=CH_3$), $R_3$ (or $R'_3$) is an isopropenyl radical and $R_4$ (or $R'_4$) is hydrogen, thus corresponding to the 3-isopropenyl-α,α-dimethylbenzylisocyanate (of general designation m-TMI® defined above). The oligomers (b) obtained from the derivatives are preferred; and 2. a compound which intrinsically has a long chain, the compound being either
   (i) a compound which is symmetrical about its terminal functions which correspond to
      a diol of formula HO—(R—Y)$_n$—R'—OH;
      a dithiol of formula HS—(R—Y)$_n$—R'—SH;
      a diamine of formula $H_2N$—(R—Y)$_n$—R'—$NH_2$;
      which allows obtaining the intrinsically symmetrical oligomers of formula (B) (intrinsically symmetrical means monomers of formula (B) in which the Z and Z' groups are functions of identical nature);
      a biepoxy of formula

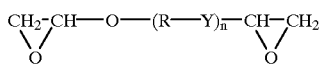

the reaction thus leading to the synthesis of the oligomers of formula (B');
   (ii) a compound which is dissymmetrical about its terminal functions:
      the functions can be an alcohol, thiol or amine function; 1 combinations thereof; these compounds allow one to obtain other intrinsically disymmetric (asymmetric) difunctional oligomers of formula (B) (intrinsically dissymmetrical means monomers of formula (B) in which the Z and Z' groups are functions of different nature);
   the functions respectively being an epoxy function and alcohol function or an epoxy function and a thiol function, the compounds then being of formula

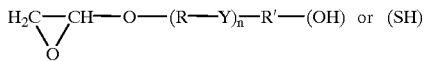

the reaction thus leading to the synthesis of oligomers of formula (B").

In every case, R, R', Y and n are such as defined above; preferentially, Y is oxygen (the long chain then being a polyalkylene chain).

The molecular mass of the long polyoxyalkylene and/or polymercaptoalkylene chain which correspond to the (R—Y)$_n$—R' or (R—Y)$_n$ radical in the formulae (B, B', B") specified above, is generally at least equal to 500 g.mol$^{-1}$ and lower than 2000 g.mol$^{-1}$, preferably between 600 g.mol$^{-1}$ and 900 g.mol$^{-1}$.

In a particularly useful embodiment, one or several intrinsically symmetrical monomers of type (b) of formula (B) (as defined above) are brought to intervene:

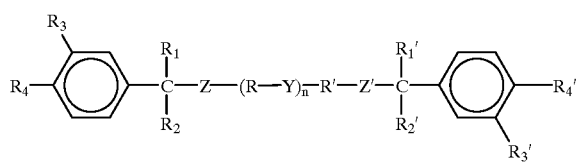

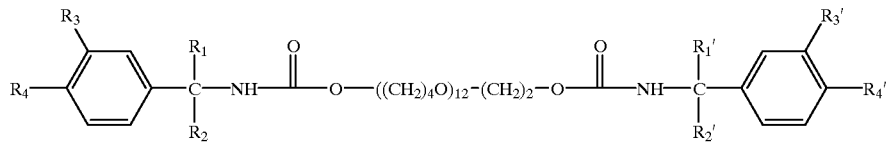

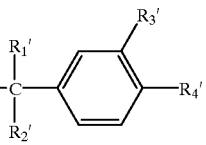

in which R, R', $R_1$, $R_2$, $R_3$, $R_4$, $R'_1$, $R'_2$, $R'_3$, $R'_4$ are such as defined above (and advantageously so that the two ends of the molecule are identical; i.e.: $R_1=R'_1$, $R_2=R'_2$, $R_3=R'_3$ and $R_4=R'_4$, with even more advantageously $R_1=R'_1=R_2=R'_2=CH_3$ and $R_3=R'_3$ and $R_4=R'_4$ with one of $R_3$ and $R_4$ being hydrogen and the other being an isopropenyl group) and Y is such as defined above and advantageously consists of an oxygen (X=O) and:

(α)
   Z and Z' are carbamate functions of formula (—NH—CO—O—) and (—O—CO—NH—) respectively;
   n is an integer defined in such a way that the total number of carbon atoms contained in the long chain situated between the two motifs Z and Z', is between 18 and 112; and advantageously, in the case of a polyoxyalkylene chain, is between 24 and 112 and particularly advantageously between 26 and 50 in the case of a polyoxyalkylene of molecular mass between 600 and 900 g.mol$^{-1}$;
or (β)
   Z and Z' are thiocarbamate functions of formula (—NH—CO—S—) and (—S—CO—NH—) respectively
   n is an integer defined in such a way that the total number of carbon atoms contained in the long chain situated between the two motifs Z and Z', is between 18 and 108; and advantageously, in the case of a polyoxyalkylene chain, is between 24 and 108 and particularly advantageously between 28 and 46 in the case of a polyoxyalkylene chain of molecular mass between 600 and 900 g.mol$^{-1}$;
or (γ)
   Z and Z' are urea functions (—NH—CO—NH—)
   n is an integer defined in such a way that the total number of carbon atoms contained in the long chain situated between the two motifs Z and Z', is between 18 and 112; and advantageously, in the case of a polyoxyalkylene chain, is between 24 and 112, and particularly advantageously between 28 and 50 in the case of a polyoxyalkylene of molecular mass between 600 and 900 g.mol$^{-1}$.

The person skilled in the art will understand that formula (B), in the case (□) above wherein the number of carbon atoms contained in the long chain is equal to 50, may for example be written:

In the same way, the person skilled in the art will have understood that generally the minimal values mentioned above which define the number of carbon atoms in the long chain of motif (R—Y)$_n$—R' or (R—Y)$_n$, correspond to compounds having a polymercaptoalkylene chain (Y=S).

In a particularly useful embodiment, the monomer(s) of type (b) have a general formula (B) such as defined above in which:
   $R_1$, $R_2$, $R'^1$ and $R'_2$, identical, are methyl radicals; $R_3$ and $R'_3$ are an isopropenyl radical; $R_4$ and $R'_4$ are hydrogen and
   + either Z and Z' are urea functions (—NH—CO—NH—) and
   R' represents an ethylene or propylene group;
   n is an integer equal to 13 or 19 which defines a total number of carbon atoms between Z and Z' equal to 28 or 40 (R—Y)$_n$ is a polyoxyethylene chain; or n is an integer equal to 10 or 14 which defines a total number of carbon atoms between Z and Z' equal to 33 or 45 when (R—Y)$_n$ is a polyoxypropylene chain; or n is an integer between the lower limit values (10 to 13) and upper limit values (14 to 19) such as defined above, when (R—Y)$_n$ is a polyoxyethylene/polyoxypropylene mixed chain; which thus defines the monomers of type (b) of designation RUDI JEF 600 and RUDI JEF 900 (see later on in the Examples), respectively when n has one of the lower limit values (n between 10 and 13 inclusive) and n has one of the upper limit values (n between 14 and 19 inclusive);
   + or Z and Z' are carbamate functions of formulae (—NH—CO—O—) and (—O—CO—NH—) respectively, and
   R' represents an ethylene group;
   (R—Y)$_n$ represents a long polyoxyethylene chain;
   n is an integer equal to 13 or 19 which defines the total number of carbon atoms contained in the long chain situated between the two motifs Z and Z' equal to 28 or 40; which thus define the monomers of type (b) of designation RUDI 600 and RUDI 900 (see Examples) when n=13 and n=19 respectively.

The monomers of type (b) are generally present in the composition to be polymerized at a rate of 1 to 60 parts by weight for 100 parts by weight of the mixture of monomers of types (a) and (b).

The polymerizable composition of the invention may furthermore contain other monomers. Generally, for 100 parts by weight of the mixture of monomers of type (a) and (b), the composition can contain from 1 to 60 parts by weight (advantageously from 10 to 50 parts by weight) of at least one monomer selected from the alkenic monomers (such as those of formulae (C) and (D) and diallylphthalate (f)), advantageously vinylic and allylic, (meth)acrylic monomers (such as those of formula (E)) and mixtures thereof. In light of the desired effects, when these types of monomers are added, person skilled in the art will know to determine and optimize the required amounts of each type of the monomer (in any case, the total amount of the monomer(s) used in the polymerizable composition is between 1 to 60 parts by weight of the mixture of monomers of type (a) and (b)).

The vinylic monomers of formula (C)—styrene and/or methylstyrene—are used in combination with the monomer (s) of type (a) in order to loosen the network. The addition of styrene may be particularly advantageous insofar as the resulting polymerized compound has a rather high refractive index (n=1.595). Styrene constitutes a particularly useful compound of this class of monomers.

The compound of formula (D) consists of divinylbenzene (DVB) or di(methylvinyl)benzene. Divinylbenzene is the particularly preferred compound of formula (D). The addition of at least one compound of formula (D) may be advantageous in that it tend to moderate, in a general manner, the effects of the compound(s) of formula (C). The beneficial action of such a compound of formula (D) has been notably demonstrated on the expression of photochromic properties. With reference to divinylbenzene, insofar as this polymerized compound has a relatively high refractive index (n=1.61), its use is also beneficial in that it leads to an increase in the refractive index of the polymers of the invention.

The polymerizable composition of the invention also contains advantageously at least one compound of formula (E) such as a (meth)acrylic monomer as defined above. It may also be a butyl, pentyl, hexyl, heptyl, octyl or 2-ethylhexyl(meth)acrylate or even ethyltriglycol(meth) acrylate. 2-ethylhexylmethacrylate (EHMA) is the preferred compound of formula (E). The presence of this type of compound has proved to be advantageous for the processing of the polymerized material and for the implementation of finishing treatments of such material. Finally, the polymerizable composition may contain diallylphthalate which notably allows adjusting the index of refraction and/or other optical and mechanical properties of the polymerized material to be adjusted.

As specified above, even though the use of the compounds of formula (C), (D), (E) and diallylphthalate (alone or in combination) is optional, these compounds tend to impart beneficial properties to the resulting polymerizable composition.

The monomers of types (a), (b) and (f) and of formulae (C), (D) and (E) are the principal constituents of the polymerizable compositions of the invention from which the copolymers or resins of the invention are generated. The copolymers are obtained from these monomers by a conventional radical copolymerization. The copolymerization is generally carried out as specified above in the presence of an effective amount of at least one polymerization modifier and at least one radical polymerization initiator.

The polymerization modifier generally intervenes at a maximal rate of 5% by weight, advantageously at the rate of 0.01 to 2% by weight, with respect to the weight of monomers to be copolymerized. It is hereby noted that it is possible to do away with the presence of such a polymerization modifier in the hypothesis where the material is prepared under a reduced thickness (thickness e<2.0 mm). In this hypothesis, the problems associated with the evacuation of heat are not encountered. For the preparation of a resin of the invention having a thickness greater than 2.0 mm, the presence of a polymerization modifier in the amounts indicated above is generally beneficial not to exceed 5 wt. % since the glass transition temperature of the material prepared becomes too low. For the preparation of articles having thicknesses between 1.5 and 20 mm, a polymerization modifier content of about 0.5 wt. % is preferred. It has been noted that the colorability and the darkening kinetics of the material of the invention increase with the amount of polymerization modifier. In the same way, when this amount goes up, the mechanical resistance increases and the optical quality improves.

It is obviously appropriate that the polymerization modifier does not destroy the photochromic coloring agent(s) which may be present during the polymerization, and also, that the modifier does not induce a discoloration of the material. The polymerization modifier is advantageously a chain transfer agent which is preferably a non-halogenated chain transfer agent such as a linear alkane thiol or bis-mercapto-ethyl ether. A non-limiting example of a linear alkane thiol is dodecanethiol. Other types of chain transfer agents such as alkane thiols substituted with at least one aryl or alkyl radical or thiophenols and other commercially available compounds may also be used.

The radical polymerization initiator or intervening catalyst (which can be either a thermal initiator, a photoinitiator, or a combination of these), must of necessity be substantially "inert" towards photochromic coloring agent(s) when such agents are present. The catalyst is generally used at a rate of 0.001 to 1% by weight, preferably from 0.005 to 0.5% by weight, with respect to the weight of the monomers present.

Thermal initiators may be selected from the diazo compounds. These compounds are familiar to the person skilled in the art and are commercially available. Examples of such diazo compounds are azobisisobutyronitrile (AIBN) and 2,2'-azobis(2-methylbutyronitrile)(AMBN). In the absence of such a catalyst or in the presence of too low an amount, it becomes necessary to carry out the copolymerization at a higher temperature and this renders the reaction difficult to control. In the presence of a large amount of catalyst, an excess of free radicals may be generated, this excess of free radicals inducing a destruction of the photochromic coloring agent(s) which may be present and an accelerated fatigue of the final material. In the latter situation, the reaction carried out may also accelerate and become difficult to control.

Another way to polymerize the composition is to use UV or visible light. In this process, the photoinitiator can be selected from molecules known in the field such as described in "Photoinitaters for Pigmented Systems" by K. Dictliker/Radiation curing in Polymer Science and Technology: Vol 2; photoinitiating systems—FOUASSIER J. P., RABECK J. F. Elsevier Applied Science pp 155. Ch3. In this case, as in thermal polymerisation, the photoinitiator must of necessity be substantially "inert" towards photochromic dyes. Examples of useful photoinitiators include benzophenones, thioxanthones, alpha-amino-aceteophenone derivatives, acylphosphine oxides, bisacylphosphine oxides and many other such compounds known to those skilled in the art. Specific examples of such compounds include acylphosphates and acyldibenzoxaphine oxide. Acylphosphine oxides can be used either alone or in combination with other classes of photoinitiators such as alpha-hydroxy ketones and benzyldimethyl ketal. One particularly useful example of a photoinitiator is IRGACURE 819 (from CIBA-GEIGY). The two types of polymerization (thermal and photopolymerization) can be used independently or in any combination to obtain the lens.

The photochromic polymers of the invention further contain an effective amount of at least one photochromic coloring agent in the matrix. The coloring agent is preferably selected from photochromic spiroxazines, photochromic pyrans such as chromenes (e.g., naphthopyrans and benzopyrans), or a combination of these. A large number of photochromic coloring agents of this type are described in the literature and are commercially available.

Particularly preferred spiroxazine coloring agents for the invention are 1,3-dihydro-3,3-dimethyl-1-neopentyl-6'-(4"-N,N-diethyl-amino)-spiro-[2H]-indole-2,3'-3H-naphtho[2,1-b][1,4]oxazine, referenced SPO1 in the Examples below and the spiroxazines described in FR-A-2 738 248.

As used herein, the term "chromenes" is broadly defined to include photochromic naphthopyrans and benzopyrans even though the preferred coloring agents of this class for the present invention are the naphthopyrans. A particularly useful coloring agent of this class is 2,2-bis-(4'-methoxyphenyl)-5,6-dimethyl-[2H]-naphtho[1,2-b]pyran, referenced CR1 in the Examples below.

Spiropyran coloring agents which are also usable within the context of the present invention are generally described in PHOTOCHROMISM G. Brown, Editor—Techniques of Chemistry—Wiley Interscience—Vol. III—1971—Chapter III—Pages 45–294—R. C. Bertelson; and PHOTOCHROMISM—Molecules & Systems—Edited by H. Dürr—H. Bouas-Laurent—Elsevier 1990—Chapter 8: Spiropyrans—Pages 314–455—R. Gugliemetti, both herein incorporated by reference.

Use of other photochromic coloring agents such as fulgides is also contemplated by the invention. The preferred photochromic coloring agents for the invention are chromenes and/or spiroxazines, more preferably napthopyrans and/or spiroxazines.

Even though the inventive photochromic resin composition may contain a single photochromic coloring agent, it is preferable to use a combination of coloring agents in order to obtain particular tints in the darkened state. In a preferred embodiment, the coloring agent is a chromenes or a combination of chromenes. A particularly preferred combination is that of the naphthopyrans referenced as CR2 and CR3 in the Examples below and corresponding to 2-(p-dimethylaminophenyl)-2-(p-methoxyphenyl)-5-methyl-7,9-dimethoxy-[2H]-naphtho-[1,2-b]pyran and 3-(p-methoxyphenyl)-3-phenyl-6-morpholino-[3H]-naphtho-[2,1-b]pyran respectively. This produces a particularly useful gray color.

By way of reference and in no way limiting, it is herein indicated that the photochromic coloring agents generally present in the polymerizable compositions in amounts in the range of 0.01 to 1% by weight, more preferably in the range of 0.05 to 0.5% by weight with respect to the total weight of monomers.

The coloring agents may themselves very well contain a polymerizable and/or cross-linkable reactive group in their chemical formula such that they also function as co-monomers in the composition to be polymerized with the result that they are chemically bound (i.e. grafted) to the matrix of the polymerized composition. Generally, the resins of the invention which are obtained from a composition containing a mixture of at least two types of different difunctional monomers (a) and (b) such as specified above, contain their photochromic coloring agent(s) either free or bonded to the matrix.

According to another of its objects, the invention relates to the resin obtained by conventional radical copolymerization of the composition of the invention. The resin may or may not be endowed with photochromic properties. When at least one photochromic coloring is present it may be added prior to the copolymerization into the polymerizable composition or after the copolymerization. The coloring agent may be introduced into the matrix at any stage in the process. For example, it may be introduced in the polymerizable composition before or after any pre-polymerization, or by diffusion after total polymerization.

Finally, a last object of the invention is constituted of photochromic or non-photochromic ophthalmic articles such as ophthalmic lenses, which are constituted wholly or in part of a resin of the invention. Non-limiting Examples of such articles are ophthalmic corrective lenses, solar lenses, glazings for vehicles or buildings, etc. In these articles, the material being optionally photochromic, may constitute the whole of the thickness of the article (mass article) or may only constitute a film or stratified layer applied on a support.

EXAMPLES

The invention is illustrated by Examples 1 to 21 and 11a, 12a and 15a below. Examples 1 to 9 are relative to the compositions of the invention which include one photochromic coloring agent of the chromene type (CR1) or a spiroxazine (SPO1) in their formulation. Examples 10 to 18 describe compositions of the invention which contain a combination of two photochromic coloring agents of the chromene type (listed in CR2-CR3 specifically). Examples 19–21 given in Table 5 differ from earlier examples in that the compositions were polymerized in the presence of photoinitiators. These Examples Tables 1 and 2, demonstrate the advantageous optical and photochromic properties of ophthalmic lenses obtained from compositions of the invention. Examples T1 to T7 (Table 3) are given by way of comparison. They are relative to control compositions which do not include the use of at least one short-chain (meth) acrylic difunctional monomer and at least one long-chain alkenic difunctional monomer in their formulation.

Examples 11a, 12a, and 15a (Table 4) are relative to the compositions of the invention described in the Examples 11, 12, and 15 respectively, the only difference being that they do not contain any photochromic coloring agent in their formulation to demonstrate that the compositions of the invention, whether or not they contain photochromic coloring agents, express identical mechanical properties. As a comparison, we have used a photochromic lens marketed under the designation TRANSITION® PLUS by TRANSITION OPTICAL, INC (Example T8-Table 4) as control for the comparative measurements of the mechanical properties. The mechanical properties of this lens confirm that, according to the prior art, in order to express photochromic properties, it is often required to sacrifice the mechanical properties of the lens. All the proportions indicated in Examples 1 to 18, 11a, 12a, and 15a and T1 to T7 are expressed in parts by weight for the different monomers which are added in the formulation (monomers of type (a), of type (b) and other monomers), and in % by weight with respect to the total weight of the monomers added in the formulation as polymerization modifiers, the polymerization initiator and the coloring agent(s). Control T8, known under the designation TRANSITION PLUS, is a modified ethylene glycol diallylcarbonate resin.

In a general manner, the long-chain alkenic difunctional monomer (of type (b)) is obtained as previously described by reaction of at least one alkenylisocyanate derivative and a long chain difunctional monomer. The long-chain monomer is synthesized according to the experimental protocol such as described below, relative to the preparation of RUDI 600:

500 g of polyethylene glycol 600 are heated at 45° C. in a thermostated (temperature regulated) reactor under nitrogen sweeping atmosphere. About 2.5 g of 4-methoxyphenol and 3 g of tin dibutyldilaurate are added into the reactor. 329 g of 3-isopropenyl-α,α-dimethylbenzyl isocyanate (available from m-TMI®) are then added into the reactor at a rate of about 300 g/hour. Once the addition of m-TMI® is complete, the mixture is left to stir at 50° C. for one hour. The product obtained (RUDI 600) is then brought to ambient temperature. It is thus ready to be mixed with the other monomer(s) and other compounds in the radically polymerizable composition.

The other alkenic difunctional oligomers of type (b) are prepared in a general manner according to the same experimental protocol.

In the case of oligomers of type (b) which have at least one urea function in their formula and which correspond to intrinsically symmetric or dissymmetric monomers of formula (B), the following experimental protocol is carried out for the synthesis of RUDI JEFF 600. It is noted in this case that the monomer of type (a) of formula (A) is mixed with the promoters of the oligomer of type (b) in the same step:

a temperature regulated glass reactor equipped with a thermometer, a stirrer, a nitrogen purger and a dropping funnel is loaded with 400 g of DIACRYL 121 (AKZO), 355 g (0.58 moles) of polyoxyethylenediamine of average molecular mass 613 (JEFFAMINE® ED600 from HUNSTMAN CORPORATION) and 1.9 g of methoxyphenol. After the total dissolution of the methoxyphenol, 233 g (1.16 moles) of 3-isopropenyl-α,α-dimethylbenzyl isocyanate (m-TMI® from CYTEC) are added dropwise over a period of 30 minutes under vigorous stirring (the reaction is strongly exothermic). The reaction mixture is maintained at a temperature of 30° C. during the addition of TMI. After the addition of the TMI, the temperature is maintained at 50° C. for 30 minutes. A copolymer constituted of monomers of type (a) and monomer(s) of type (b) (RUDI JEFF 600 in the present case) is thus obtained which is colorless and ready to be diluted with the other monomer(s) which may intervene in the polymerizable composition (monomers, notably of formula (C), (D), (E), diallylphthalate). It should be noted that the monomer of type (b) of formula (B) may also be prepared, if desired, directly in the presence of all the types of monomers which may intervene in the polymerizable composition ("one-pot" reaction). This synthesis may also be carried out in a solvent or in a mixture of solvents which are inert towards the isocyanate function. In this case, the solvent will have to be removed according to traditional methods (for example by evaporation, before or after dilution of the other (monomers of formula (C), (D), (E), diallylphthalate).

Several 2 mm thick samples were prepared as test samples in order to evaluate their optical quality and/or their mechanical properties, as well as eventually their photochromic properties. These samples were been obtained by carrying out the copolymerization of the polymerizable composition in an adequate mold under the following conditions: the polymerizable composition is heated slowly until the start of thermal degradation of the catalyst (radical polymerization initiator), a degradation which generates free radicals. Once the temperature of 60° C. is attained, it is maintained for 8 hours. The copolymerization is continued for 2 hours at 90° C. At the end of this heat treatment, the samples are turned out and re-baked for one hour at 120° C. Test samples of the material to be tested are thus obtained.

The heat treatment specified above is carried out for the purpose of obtaining ophthalmic lenses from the polymerizable compositions of the invention treated in lens molds.

The starting materials used in the Examples are the following:

| Monomers | |
| --- | --- |
| Monomers of type (a) | |
| DIACRYL 121 from AKZO Chimie (formula A) (tetraethoxylated Bisphenol A dimethacrylate) | D121 |
| Butanedioldimethacrylate (formula A') | BDDMA |
| Diethyleneglycol dimethacrylate (formula A') | DEGDMA |
| Monomers of type (b) | |
| [m-TMI ® + polyethyleneglycol (M = 600)] (formula B) | RUDI 600 |
| [m-TMI ® + polyethyleneglycol (M = 900)] (formula B) | RUDI 900 |
| [m-TMI ® + polypropyleneglycol (M = 725)] (formula B) | RUDI PPG 725 |
| [m-TMI ® + polytetramethyleneglycol (M = 1000)] (formula B) | RUDI PTMG 1000 |
| [m-TMI ® + poly(oxyethylene)diamine* (M = 600)] (formula B) | RUDI JEF 600 |
| [m-TMI ® + poly(oxyethylene)diamine*(M = 900)] (formula B) | RUDI JEF 900 |
| [m-TMI ® + poly(oxyethylene)diamine*(M = 2000)] (formula B) | RUDI JEF 2000 |
| [m-TMI ® + polycaprolactone (M = 530)] (formula B') | RUDI PCL 530 |

*poly(oxyethylene)diamine 600, 900, 2000: JEFFAMINE ® ED600-ED900-ED2001 from HUNSTMAN CORPORATION.

| Additives | |
| --- | --- |
| 3-isopropenyl-☐☐☐-dimethylbenzylisocyanate (CYTEC) | m-TMI ® |
| Diethyleneglycol | DEG |
| 2-Ethylhexylmethacrylate | EHMA |
| Benzylmethacrylate | BzMA |
| Pentaerythritoltetracrylate | PETA |
| Hydroxyethylmethacrylate | HEMA |
| Styrene | STY |
| Divinylbenzene | DVB |
| Catalyst (radical polymerization initiator) | |
| 2,2'-azobis(2-methylbutyronitrile) | AMBN |
| IRGACURE 819 (from Ciba-Geigy) | |
| Polymerization modifier | |
| n-Dodecane-1-thiol | DDT |
| Photochromic coloring agents | |
| Spiroxazine: 1,3-dihydro-3,3-dimethyl-1-neopentyl-6'-(4"-N,N-diethylamino)-spiro-[2H]-indole-2,3'-3H-naphtho-[2,1-b][1,4]oxazine, marketed by James Robinson Limited. | SPO1 |
| Chromenes: | CRI |
| (a) 2,2-bis (4'-methoxyphenyl) -5,6- dimethyl-[2H] -naphtho-[1,2-b]pyran, marketed by James Robinson Limited. | |
| (b) 2-(p-dimethylaminophenyl)-2-(p-methoxyphenyl)-5-methyl-7,9-dimethoxy-[2H]-naphtho-[1,2-b]pyran | CR2 |
| (c) 3-(p-methoxyphenyl)-3-phenyl-6-morpholino-[3H]-naphtho-[2,1-b]pyran; | CR3 |

Test samples according to the invention have been prepared (Examples 1 to 21 and 11a, 12a, 15a) as well as those of control material which do not contain a long-chain vinylic difunctional monomer (Examples T1 to T7) by polymerizing polymerizable compositions, whose formulations are specified in Tables 1 to 5 below, under the above conditions.

The photochromic properties of the materials obtained were evaluated by the measurement of two parameters: colorability and time of half-fading. Colorablity ($DO_\infty-DO_0$) measures the evolution of the optical density of a normalized sample (of 2 mm thickness). The sample, whose optical density $DO_0$ has been measured (before exposure), is exposed under a xenon lamp (40 000 lux). At the end of this exposure the new optical density $DO_\infty$ is measured at the equilibrium of the darkened sample. The measurement is effected at the maximal absorption wavelength of the coloring agent namely, 628 nm for SPO1, 500 nm for CR1, and 560 nm for CR2-CR3 (in the case of the mixture CR2-CR3 the measurement is effected at 560 nm, the wavelength corresponding to the maximum of sensitivity of the eye). The colorability or darkening rate is quantified by the absolute value of the difference of the optical densities $DO_\infty$ and $DO_0$. The value of $DO_0$ and $D_\infty$ are indicated in the various Tables. Time of half-fading ($t_{1/2}(s)$) characterizes the kinetics of the return to the initial state. At the end of the exposure under the above conditions ($DO_\infty$), the exposure is cut off and the time necessary for the sample to return to $DO_\infty-DO_0/2$ is timed and this is $t_{1/2}$.

The optical quality of the materials is determined by the presence (or lack) of optical constraints and/or optical inhomogenities (strings, gel particles, etc.) when the material is submitted to polarized light. The optical quality is considered to be good (G) when little or no optical constraints and/or inhomogenities appear, otherwise poor (P).

The mechanical properties and the optical properties of the materials obtained were evaluated with the aid of a viscoelasticimeter (frequency 1 Hz) by the measurement of various parameters:

the refractive index and;

the dispersion γd;

the hardness (Shore D);

The glass transition temperature determined by measuring the tangential maximum δ (Tg(max, tg δ)(° C.)) is determined by dynamic mechanical analysis (DMA) which is familiar to the person skilled in the art.

The elasticity modulus (E'(Gpa)) measured at 25° C. and at 100° C. (at the rubber plateau).

The person skilled in the art knows that, for a cross-linked polymer such as desired for ophthalmic applications, a Tg>100° C., a high E' at 25° C. and an E' at 100° C. which is not too low are all necessary. The E' at 100° C. gives an indication of the softening of the lens during polishing or cutting-out and during surface treatments (anti-scratching or antireflection).

TABLE 1

| Formulation | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| D121 | 80 | 80 | 80 | 80 | 80 | 80 | 80 | 80 | — |
| BDDMA | — | — | — | — | — | — | — | — | 25 |
| DEGDMA | — | — | — | — | — | — | — | — | 25 |
| RUDI 600 | — | 20 | — | — | — | 20 | — | — | 50 |
| RUDI 900 | 20 | — | — | — | — | — | — | — | — |
| RUDI PTMG 1000 | — | — | 20 | — | — | — | — | — | — |
| RUDI PPG 725 | — | — | — | 20 | — | — | — | — | — |
| RUDI PCL 530 | — | — | — | — | 20 | — | — | — | — |
| RUDI JEF 600 | — | — | — | — | — | — | — | 20 | — |
| RUDI JEF 900 | — | — | — | — | — | — | 20 | — | — |
| AMBN | 0.2 | 0.2 | 0.2 | 0.2 | 0.2 | 0.2 | 0.2 | 0.2 | 0.2 |
| DDT | 0.5 | 0.5 | 0.5 | 0.5 | 0.5 | 0.5 | 0.5 | 0.5 | 0.5 |
| SPO1 | — | — | — | — | — | 0.05 | — | — | — |
| CR1 | 0.05 | 0.05 | 0.05 | 0.05 | 0.05 | 0.05 | 0.05 | 0.05 | 0.05 |
| Photochromic properties | | | | | | | | | |
| $DO_0$ | 0.06 | 0.06 | 0.06 | 0.06 | 0.06 | 0.06 | 0.06 | 0.06 | 0.06 |
| $DO_\infty$ | 1.29 | 1.27 | 1.28 | 1.25 | 1.20 | 1.28 | 1.32 | 1.24 | 1.44 |
| $t_{1/2}$ lightening | 50 s | 65 s | 65 s | 70 s | 70 s | 23 s | 55 s | 70 s | 35 s |
| Optical quality | G | G | G | G | G | G | G | G | G |

Photochromic properties

The results clearly show the very good photochromic properties of the materials of the invention. Thus, in all the Examples 1 to 9 characteristic of nanobiphasic soft polymer matrices, it is observed that the kinetics of return to the darkened state are very rapid while: 35 s<$t_{1/2}$ fading<70 s for the samples of material which contain a photochromic coloring agent of the chromene type (CR1). By replacing the chromene by a coloring agent from the spiroxazine family (SPO1) slightly intensifies the value of the time of half-darkening (Example 6: $t_{1/2}$ fading=23 s).

The Examples 10 to 18 show that the judicious association of two photochromic coloring agents of the chromene type (CR2-CR3) within the nanophasic soft matrix creates a synergetic effect upon the colorability and the kinetics of return from the darkened state to the light state. In fact, for these different formulations, a time of half-darkening such as 25 s<$t_{1/2}$<50 s is observed and an optical density at equilibrium whose values (DO$_\infty$) are between 0.95 and 1.12. The significance of this CR2-CR3 association is hereby stressed

TABLE 2

| Formulation | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| D121 | 52 | 67.6 | — | — | 53 | 67.6 | 39.8 | 53 | 53 |
| BDDMA | 12 | — | 25 | 25 | — | — | — | — | — |
| DEGDMA | 12 | — | 25 | 25 | — | — | — | — | — |
| RUDI 600 | 24 | 32.4 | 50 | — | — | — | — | — | — |
| RUDI JEF 600 | — | — | — | — | — | — | 60.2 | 28.2(1) | 33(1) |
| RUDI JEF 900 | — | — | — | 50 | 47 | 32.4 | — | — | — |
| RUDI JEF 2000 | — | — | — | — | — | — | — | 18.8(2) | 14(2) |
| BzMA | — | 17 | — | — | 17 | 17 | 17 | 17 | 17 |
| EHMA | — | 9.6 | — | — | 9.6 | 9.6 | 9.6 | 9.6 | 9.6 |
| DVB | — | 16.2 | — | — | 16.2 | 16 | 16.2 | 16.2 | 16.2 |
| AMBN | 0.2 | 0.2 | 0.2 | 0.2 | 0.2 | 0.22 | 0.2 | 0.2 | 0.2 |
| DDT | 0.5 | 0.5 | 0.5 | 0.5 | 0.5 | 0.5 | 0.5 | 0.5 | 0.5 |
| CR2-CR3 | 0.075/ 0.009 | 0.075/ 0.009 | 0.075/ 0.009 | 0.075/ 0.009 | 0.075/ 0.009 | 0.075/ 0.009 | 0.075/ 0.009 | 0.075/ 0.009 | 0.075/ 0.009 |
| Photochromic properties | | | | | | | | | |
| DO$_0$ | 0.06 | 0.06 | 0.06 | 0.06 | 0.06 | 0.06 | 0.06 | 0.06 | 0.06 |
| DO$_\infty$ | 1.04 | 1.07 | 1.01 | 0.99 | 1.12 | 1.07 | 0.96 | 0.98 | 0.95 |
| $t_{1/2}$ lightening | 35 s | 40 s | 30 s | 40 s | 25 s | 40 s | 50s | 30s | 40s |
| Optical quality | G | G | G | G | G | G | G | G | G | note: Ex. 17: (2)/(1) = 40/60: Ex. 18 (2)/(1) = 30/70 upon insofar as the color that it generates (gray) is acceptable to the consumer.

TABLE 3

| Formulation | Ex. T1 | Ex. T2 | Ex. T3 | Ex. T4 | Ex. T5 | Ex. T6 | Ex. T7 |
|---|---|---|---|---|---|---|---|
| D121 | 100 | 100 | 80 | 80 | — | — | 80 |
| STY | — | — | 20 | 20 | — | — | 20 |
| TMI ®/HEMA | — | — | — | — | 100 | — | — |
| TMI ®/DEG | — | — | — | — | — | 60 | — |
| PETA | — | — | — | — | 40 | — | — |
| AMBN | 0.2 | 0.2 | 0.2 | 0.2 | 0.2 | 0.2 | 0.2 |
| DDT | 0.5 | 0.5 | 0.5 | 0.5 | 0.5 | 0.5 | 0.5 |
| SPO1 | — | 0.05 | — | 0.05 | — | — | — |
| CR1 | 0.05 | — | 0.05 | — | 0.05 | 0.05 | — |
| CR2-CR3 | — | — | — | — | — | — | 0.075/ 0.009 |
| Photochromic properties | — | — | — | — | — | — | — |
| DO$_0$ | 0.06 | 0.06 | 0.06 | 0.06 | 0.06 | 0.06 | 0.06 |
| DO$_\infty$ | 0.95 | 1.56 | 1.00 | 1.33 | 0.95 | 1.40 | 0.80 |
| $t_{1/2}$ fading | 150 s | 51 s | 400 s | 1000 s | 250 s | 130 s | 1500 s |
| Optical quality | P | P | G | G | G | G | G |

The results of the control samples clearly demonstrate the significance of the polymerizable compositions of the invention for materials, which have to have photochromic properties. Thus, the mediocre values of the time of half-darkening are easily noted (130 s<$t_{1/2}$<1500 s) obtained for the Examples T3 to T6 relative to the formulations having acceptable optical properties.

TABLE 4

|  | Ex. 11a | Ex. 12a | Ex. 15a | Ex. T8 |
|---|---|---|---|---|
| nd | 1.553 | 1.522 | 1.556 | 1.500 |
| γd | 38.4 | 49.1 | 38.2 | 57.0 |
| Tg (max, tg δ) | 0.20 | 0.18 | 0.20 | 0.24 |
| (° C.) | 104 | 124 | 108 | 94 |
| E'$_{25°\ C.}$ (GPa) | 1.96 | 1.95 | 2.30 | 1.96 |
| E'$_{100°\ C.}$ (Gpa) | 0.31 | 0.50 | 0.43 | 0.20 |
| hardness (ShoreD) | 85 | 85 | 87 | 82 |

Mechanical properties

The Examples relative to the non-photochromic compositions of the invention show that the materials obtained have characteristics of viscoelasticity and mechanical properties equal even better than those exhibited by control Example T8. Thus, the elasticity modulus at the rubber plateau E'$_{100°\ C.}$ (GPa) are better in the case of the Examples 11a, 12a and 15a, while not being too high, which prevents thus the risk of breakage in the "drop-ball test". The Applicant has checked that the intervention of photochromic coloring agent(s) in its resins does not modify their mechanical properties at all. The resins according to Examples 1 to 18 have mechanical properties identical to those of non-photochromic lenses. This is not the case of the photochromic control lens (Example T8) whose values of the temperature of the maximum of slope and the E' at 100° C. are too low to have acceptable mechanical properties within the non-photochromic context.

TABLE 5

| Formulation | Ex. 19 | Ex. 20 | Ex. 21 |
|---|---|---|---|
| D121 | 80 | 80 | 43.5 |
| BDDMA | — | — | — |
| DEGDMA | — | — | 25 |
| RUDI 600 | — | 32.4 | 50 |
| RUDI JEF 600 | 12 | 12 | 20 |
| RUDI JEF 900 | — | — | — |
| RUDI JEF 2000 | 8 | 8 | 8.5 |
| BzMA | — | — | 14.5 |
| EHMA | — | — | 3 |
| DVB | — | 16.2 | 11.5 |
| AMBN | — | — | — |
| IRGACURE 819 | 0.12 | 0.12 | 0.12 |
| DDT | 0.5 | 0.5 | 0.5 |
| SPO1 | .05 | — | — |
| CR1 | — | .05 | — |
| CR2-CR3 | — | — | 0.075/ 0.0095 |
| Photochromic properties | — | — | — |
| t1/2 fading (seconds) | 150 | 65 | 60 |
| Optical quality | G | G | G |

In all three cases, the polymerization was performed by 3 hours of exposure to the UV/visible light of a xenon lamp (10 mW/cm$^2$ at 420 nm). Under these conditions, reasonable photochromic performance was obtained, as indicated by the $t_{1/2}$ lightening time for the three examples. In addition, no defects such as striations were observed in these samples.

The materials (resins) obtained from polymerizable compositions of the invention thus have superior optical qualities and mechanical properties at least equal and generally superior to those of the materials of the prior art and moreover are particularly suited to be used as photochromic materials.

The optical quality (Tables 1, 2 and 3) show the beneficial effect of the association of the D121 (monomer of formula (A)) with at least one second long-chain vinylic difunctional monomer of type (b) upon the optical quality of the material. We have shown that essentially that every formulation of the invention corresponding to the Examples 1 to 8, 10–11 and 14 to 18 had little or no optical constraints. This result is in sharp contrast to Examples T1 and T2 which used D121 and for which the optical qualities of the material are poor. In the case where a mixture of monomers of formula (A') (Examples 9, 12 and 13) are used in association with a long-chain vinylic difunctional monomer of type (B), the resulting lens exhibited good optical qualities. Also, good optical qualities were obtained for formulations which contain either D121 or styrene (Examples T3, T4 and T7), or a short-chain difunctional monomer having a vinyl-methacrylic motif (Example T 5), or an association of a short-chain vinylic difunctional monomer (TMI®/DEG) with a short-chain methacrylate polyfunctional monomer (PETA) (Example T6). However, as shown below these compositions did not yield good photochromic properties.

What is claimed is:

1. Radically polymerizable composition comprising a mixture of:
  (a) one or more difunctional monomers of type (a) selected from the group consisting of monomers represented by:
  Formula (A):

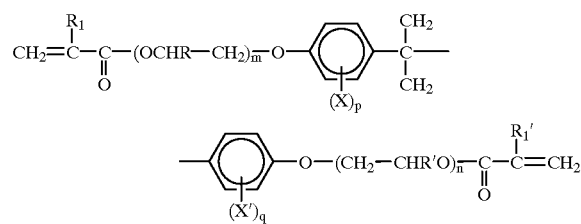

in which:
R$_1$, R'$_1$, R and R', identical or different, independently are a hydrogen or a methyl group;
m and n are, independently, integers between 0 and 4 inclusive;
X and X', identical or different, are a halogen;
p and q are, independently, integers between 0 and 4 inclusive; and
Formula (A'):

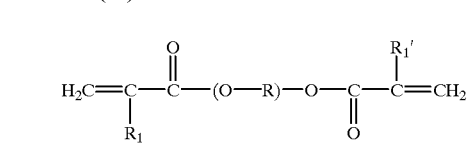

in which:
R$_1$ and R'$_1$, identical or different, independently are a hydrogen or a methyl group;
R is a linear or branched alkyl radical having from 2 to 8 carbon atoms, a cycloalkyl radical having from 3 to 6 carbon atoms, an ether radical of formula (R'—O—R") in which R' and R", identical or different, independently are a linear or branched alkyl radical having from 2 to 4 carbon atoms;

(b) one or more difunctional monomers of type (b) selected from the group consisting of long chain alkenic difunctional oligomers represented by:
Formula (B):

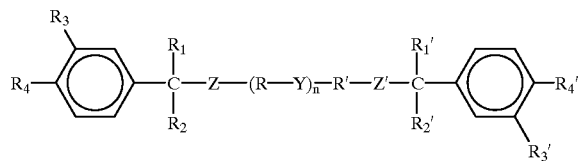

in which:
$R_1$, $R'_1$, $R_2$ and $R'_2$, identical or different, independently are hydrogen or a linear or branched alkyl radical;
$R_3$ and $R_4$, different, are independently one hydrogen and the other an alkenyl radical having from 2 to 6 carbon atoms;
$R'_3$ and $R'_4$, different, are independently one hydrogen and the other an alkenyl radical having from 2 to 6 carbon atoms;
Z represents a carbamate function (—NH—CO—O—), a thiocarbamate function (—NH—CO—S—) or a urea function (—NH—CO—NH—);
Z', independent from Z, represents a carbamate function (—O—CO—NH—), a thiocarbamate function (—S—CO—NH—) or a urea function (—NH—CO—NH—);
R' represents a linear or branched alkyl radical having from 2 to 4 carbon atoms;
R, identical or different when $n \geq 2$, is a linear or branched alkyl radical having from 2 to 4 carbon atoms;
Y, identical or different when $n \geq 2$, is oxygen or sulfur;
n is an integer defined in such a way that the total number of carbon atoms contained in the long chain situated between the two motifs Z and Z' is at least equal to 18;
Formula (B'):

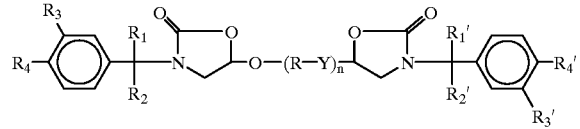

in which:
$R_1$, $R_2$, $R_3$, $R_4$, $R'_1$, $R'_2$, $R'_3$, $R'_4$, R and Y are such as defined above with reference to formula (B);
n is an integer defined in such a way that the total number of carbon atoms contained in the long chain of the motif $(R—Y)_n$ is at least equal to 22; and
Formula (B"):

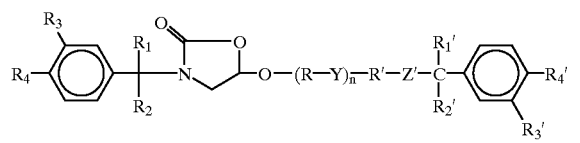

in which:
$R_1$, $R_2$, $R_3$, $R_4$, $R'_1$, $R'_2$, $R'_3$, $R'_4$, R, R' and Y are such as defined above with reference to formula (B);
Z' is a carbamate function (—O—CO—NH—) or Z' is a thiocarbamate function (—S—CO—NH—);
n is an integer defined in such a way that the total number of carbon atoms contained in the long chain of the motif $(R—Y)_n—R'$ is at least equal to 22.

2. Polymerizable composition according to claim 1, characterized in that the polymerizable composition comprises one or more difunctional monomers of type (a) being of formula (A) in which:
$R_1$ and $R'_1$, identical, are a methyl group;
R and R', identical, are hydrogen or a methyl group;
m and n independently are 1 or 2;
p and q are identical and equal to 0.

3. Polymerizable composition according to claim 1, wherein the difunctional monomer of type (b) is such that the long polyoxyalkylene and/or polymercaptoalkylene chain, represented by the motif $(R—Y)_n—R'$ in the case of formula (B) and (B"), or $(R—Y)_n$ in the case of formula (B'), have a molecular mass between 500 g.mol$^{-1}$ and 2,000 g.mol$^{-1}$.

4. Polymerizable composition according to claim 3, wherein the molecular mass of said long chain is at least 600 g.mol$^{-1}$ but lower than 900 g.mol$^{-1}$.

5. Polymerizable composition according to claim 1, wherein the difunctional monomer of type (b) is such that $R_1$, $R'_1$, $R_2$, $R'_2$ are identical and represent a methyl group, $R_3$ and $R'_3$ are identical and represent an isopropenyl group and $R_4$ and $R'_4$ are identical and represent hydrogen.

6. Polymerizable composition according to claim 1, wherein the difunctional monomer of type (b) is represented by formula (B):

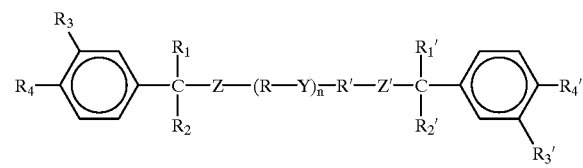

in which
R, R', $R_1$, $R_2$, $R_3$, $R_4$, $R'_1$, $R'_2$, $R'_3$, $R'_4$ and Y are such as defined previously; and
(a) when Z and Z' are carbamate functions of formula (—NH—CO—O—) and (—O—CO—NH—) respectively, n is an integer defined in such a way that the total number of carbon atoms contained in the long chain situated between the two motifs Z and Z', is between 18 and 112;
(b) when Z and Z' are thiocarbamate functions of formula (—NH—CO—S—) and (—S—CO—NH—) respectively, n is an integer defined in such a way that the total number of carbon atoms contained in the long chain situated between the two motifs Z and Z', is between 18 and 108; and
(c) when Z and Z' are urea functions (—NH—CO—NH—), n is an integer defined in such a way that the total number of carbon atoms contained in the long chain situated between the two motifs Z and Z', is between 18 and 112.

7. Polymerizable composition according to claim 6, wherein the group, situated between Z and Z' represents a polyoxyalkylene chain in which Y represents oxygen; and
(a) when Z and Z' are carbamate functions of formula (—NH—CO—O—) and (—O—CO—NH—) respectively, n is an integer defined in such a way that the total number of carbon atoms contained in the polyoxyalkylene chain is between 24 and 112;
(b) when Z and Z' are thiocarbamate functions of formula (—NH—CO—S—) and (—S—CO—NH—) respectively, n is an integer defined in such a way that the total number of carbon atoms contained in the polyoxyalkylene chain is between 24 and 108; or (c) when Z and Z' are urea functions of formula (—NH—CO—NH—), n is an integer defined in such a way that the total number of carbon atoms contained in the polyoxyalkylene chain is between 24 and 112.

8. Polymerizable composition according to claim 7, wherein when Z and Z' are carbamate functions of formula (—NH—CO—O—) and (—O—CO—NH—) respectively, n is an integer defined in such a way that the total number of carbon atoms contained in the polyoxyalkylene chain is between 26 and 50; when Z and Z' are thiocarbamate functions of formula (—NH—CO—S—) and (—S—CO—NH—) respectively, n is an integer defined in such a way that the total number of carbon atoms contained in the polyoxyalkylene chain is between 28 and 46; and when Z and Z' are urea functions of formula (—NH—CO—NH—), n is an integer defined in such a way that the total number of carbon atoms contained in the polyoxyalkylene chain is between 28 and 50.

9. Polymerizable composition according to claim 1, wherein in the monomer of formula (B), Z and Z' are urea functions (—NH—CO—NH—);

$R_1$, $R'_1$, $R_2$, $R'_2$ are identical and represent a methyl group, $R_3$ and $R'_3$ are identical and represent an isopropenyl group and $R_4$ and $R'_4$ are identical and represent hydrogen;

R' represents an ethylene or propylene group; and when $(R—Y)_n$ is a polyoxyethylene chain, n is an integer defined such that the total number of carbon atoms in the chain is equal to 28 or 40; when $(R—Y)_n$ is a polyoxypropylene chain, n is an integer defined such that the total number of carbon atoms in the chain is equal to 33 or 45; and when $(R—Y)_n$ is a mixed polyoxyethylene/polyoxypropylene chain, n is an integer between the lower limit of 10 to 13 and higher limit of 14 to 19.

10. Polymerizable composition according to claim 1, characterized in that the amount of monomer(s) of type (a) is between 40 and 99 parts by weight, for 100 parts by weight of the mixture of monomers of type (a) and (b).

11. Polymerizable composition according to claim 1, characterized in that it contains for 100 parts by weight of the mixture of monomers of type (a) and (b), from 1 to 60 parts by weight of at least one monomer selected from alkenic monomers, (meth)acrylic monomers, and mixtures thereof.

12. Polymerizable composition according to claim 11, wherein the alkenic monomer is selected from the group consisting of vinylic and allylic monomers.

13. Polymerizable composition according to claim 1, characterized in that the polymerizable composition contains at least one monomer selected from the group consisting of:

(a) one or more aromatic monovinylic monomer of formula (C):

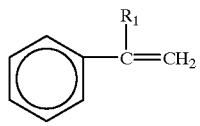

in which $R_1$=H or $CH_3$;

(b) one or more aromatic divinylic monomer of formula (D):

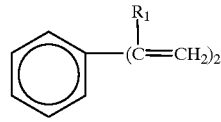

in which $R_1$=H or $CH_3$;

(c) one or more (meth)acrylic monomer of formula (E):

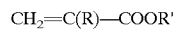

$CH_2$=C(R)—COOR' in which $R_1$=H or $CH_3$ and R' is selected from the group consisting of: a linear or branched alkyl radical having from 4 to 16 carbon atoms, a substituted or unsubstituted methylphenyl or methylphenoxy radical, and a polyoxyethoxyl group of formula —($CH_2$—$CH_2$—O$)_n$R" in which n is an integer between 1 and 10 and R"=$CH_3$ or $C_2H_5$; and (d) diallylphthalate.

14. Polymerizable composition according to claim 13, wherein said monovinylic monomer is styrene, the divinylic monomer is divinylbenzene; and the (meth)acrylic monomer is ethylhexylmethacrylate.

15. Polymerizable composition according to claim 13, characterized in that it further comprises an effective amount of at least one photochromic coloring agent which confers photochromic properties to said composition.

16. Polymerizable composition according to claim 15 wherein the coloring agent is selected from the group consisting of spiroxazines, spiropyrans, chromenes and mixtures thereof.

17. Polymerizable composition according to claim 16, wherein the coloring agent is a mixture comprising, at least one spiroxazine, at least one chromene or a mixture of chromene(s).

18. Polymerizable composition according to claim 15, wherein the coloring agent is a mixture of at least two chromenes.

19. Polymerizable composition according to claim 18, characterized in that it further comprises an effective amount of a radical polymerization initiator.

20. Polymerizable composition according to claim 19, wherein the radical polymerizable composition is selected from the group consisting of a thermal initiator, a photoinitiator and a combination of these.

21. Polymerizable composition according to claim 19, wherein the coloring agent is a mixture of 2-(p-dimethylaminophenyl)-2-(p-methoxyphenyl)-5-methyl-7,9-dimethoxy-[2H]-naphtho-[1,2-b]pyran and 3-(p-methoxyphenyl)-3-phenyl-6-morpholino-[3H]-naphtho-[2,1-b]pyran.

22. Resin obtainable by radical co-polymerization of a polymerizable composition according to claim 1.

23. Ophthalmic article comprising a resin according to claim 22.

24. Polymerizable composition according to claim 1, wherein in the monomer of formula (B), Z and Z' are carbamate functions of formula (—NH—CO—O—) and (—O—CO—NH—) respectively;

$R_1$, $R_2$, $R_3$, $R_4$, $R'_1$, $R'_2$, $R'_3$, $R'_4$ and Y are such as defined in claim 1;

R' represents an ethylene group;

$(R—Y)_n$ represents a long chain polyoxyethylene;

n is an integer whose value is selected such that the total number of carbon atoms contained in the long chain (R—Y)$_n$—R', situated between the two motifs Z and Z', is equal to 28 or 40.

25. Polymerizable composition according to claim 10, characterized in that the polymerizable composition contains at least one monomer selected from the group consisting of:

(a) one or more aromatic monovinylic monomer of formula (C):

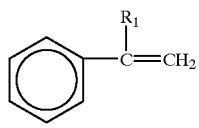

in which R$_1$=H or CH$_3$;

(b) one or more aromatic divinylic monomer of formula (D):

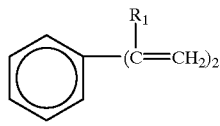

in which R$_1$=H or CH$_3$;

(c) one or more (meth)acrylic monomer of formula (E):

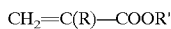

in which R$_1$=H or CH$_3$ and R' is selected from the group consisting of: a linear or branched alkyl radical having from 4 to 16 carbon atoms, a substituted or unsubstituted methylphenyl or methylphenoxy radical, and a polyoxyethoxyl group of formula —(CH$_2$—CH$_2$—O)$_n$R" in which n is an integer between 1 and 10 and R"=CH$_3$ or C$_2$H$_5$; and (d) diallylphthalate.

26. Resin obtainable by radical co-polymerization of a polymerizable composition according to claim 13.

27. Ophthalmic article comprising a resin according to claim 26.

28. Resin obtainable by radical co-polymerization of a polymerizable composition according to claim 15.

29. Ophthalmic article comprising a resin according to claim 28.

30. Resin obtainable by radical co-polymerization of a polymerizable composition according to claim 19.

31. Ophthalmic article comprising a resin according to claim 30.

32. Resin obtainable by radical co-polymerization of a polymerizable composition according to claim 25.

33. Ophthalmic article comprising a resin according to claim 32.

* * * * *